(12) United States Patent
Lee (10) Patent No.: US 7,712,970 B1
(45) Date of Patent: May 11, 2010

(54) DETACHABLE FIBER OPTIC CONNECTOR

(75) Inventor: Chih-Ping Lee, Tucheng (TW)

(73) Assignee: Alliance Fiber Optic Products Co., Ltd., Taipei County (TW)

( * ) Notice: Subject to any disclaimer, the term of this patent is extended or adjusted under 35 U.S.C. 154(b) by 0 days.

(21) Appl. No.: 12/351,860

(22) Filed: Jan. 12, 2009

(51) Int. Cl.
G02B 6/38 (2006.01)

(52) U.S. Cl. .......................................... 385/58; 385/59

(58) Field of Classification Search ........................ None
See application file for complete search history.

(56) References Cited

U.S. PATENT DOCUMENTS 7,540,667 B2 * 6/2009 Murano ....................... 385/60

2006/0263011 A1 * 11/2006 Chen et al. ..................... 385/75
2009/0245732 A1 * 10/2009 Murano ........................ 385/59

* cited by examiner

Primary Examiner—Omar Rojas (57) ABSTRACT

A detachable fiber optic connector includes a bottom cover shell having a rear extension, a rear cover covering the rear extension of the bottom cover shell to hold down a fiber optic, and a top cover shell detachably covered on the bottom cover shell to hold down connection modules that are respectively connected to fiber cores of the fiber optic. By means of pressing a retaining block of the rear cover downwardly away from a rear end edge of the top cover shell, the top cover shell can be pushed backwards and then pulled upwards to move coupling flanges thereof along bottom grooves of the bottom cover shell and then out of side grooves of the bottom cover shell, thereby exposing the connection modules and the fiber cores of the fiber optic to the outside for position interchange.

10 Claims, 8 Drawing Sheets

DETACHABLE FIBER OPTIC CONNECTOR

BACKGROUND OF THE INVENTION

1. Field of the Invention

The present invention relates to a fiber optic connectors and more particularly, to a detachable fiber optic connector, which allows quick interchange of the positions of the connection modules and the fiber cores of the connected fiber optic in the bottom cover shell without any tools.

2. Description of the Related Art

Following fast development of modern technology and arrival of the network era, many different signal transmission techniques have been created and improved to satisfy different application requirements. In recent years, fiber optics are intensively used to replace copper wire as an appropriate means of communication signal transmission. Fiber optics span the long distances between local phone systems as well as providing the backbone for many network systems. Fiber optics use light pulses to transmit information down fiber lines instead of using electronic pulses to transmit information down copper lines.

Further, there are known 6 different types of fiber optic connectors, i.e., VF-45, MT-RJ, LC, SC, FC and ST. SC and LC are most popularly adopted. Among these two popular types of fiber optic connectors, LC type fiber optic connector shows superiority in many aspects, such as shrinking the ferrules to 1.25 mm in diameter with a fiber pitch of 6.25 mm (duplex).

Figure 8:
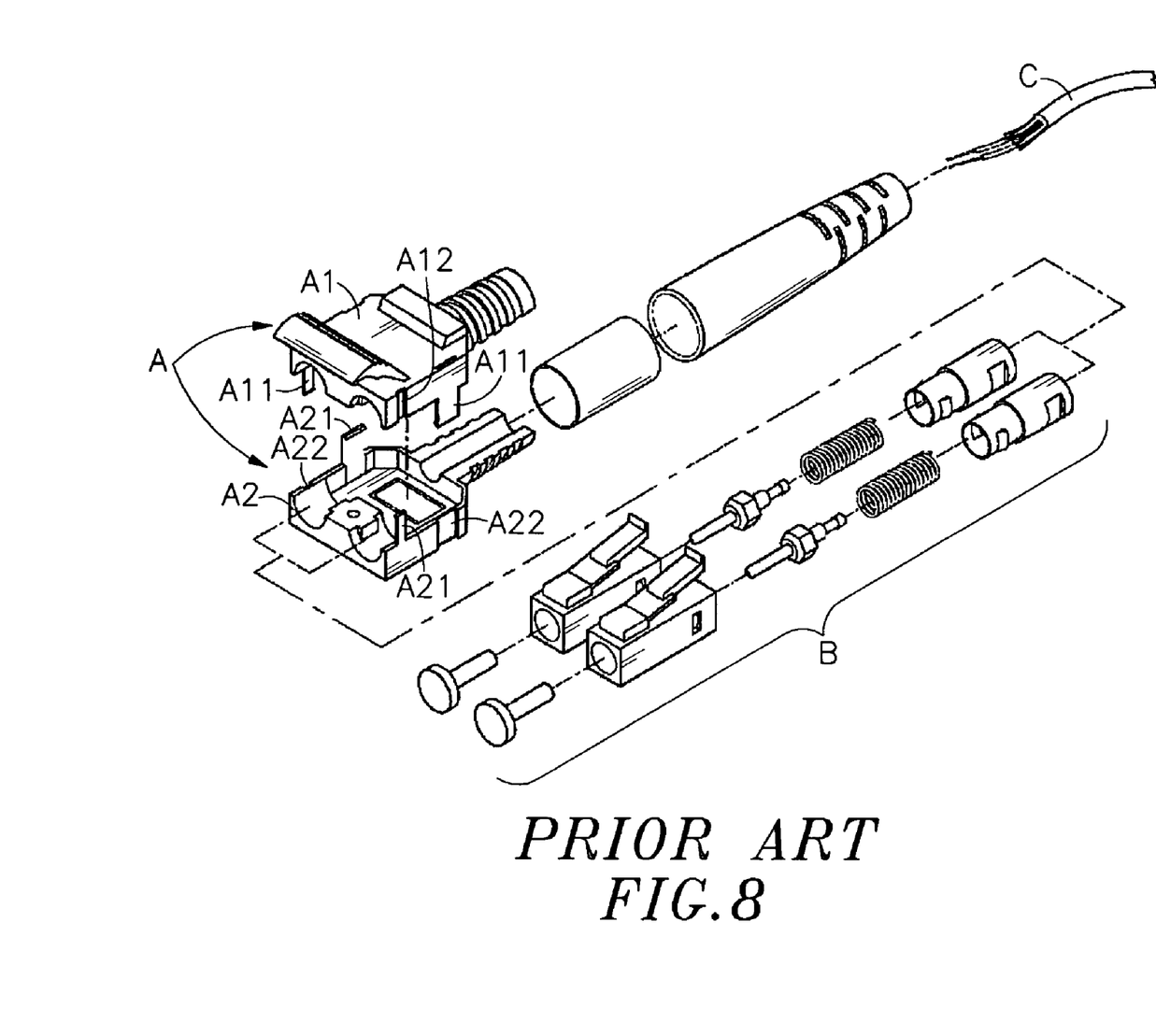
FIG. 8 is an exploded view of a fiber optic connector according to the prior art.

FIG. 8 shows a fiber optic connector according to the prior art. According to this design, the fiber optic connector comprises a housing A, two connection modules B and a fiber optic cable C. The housing A is formed of a top cover shell A1 and a bottom cover shell A2. The top cover shell A1 has mounting hooks A11 and mounting grooves A12. The bottom cover shell A2 has mounting hooks A21 and mounting grooves A22 respectively forced into engagement with the mounting grooves A12 and the mounting hooks A11 of the top cover shell A1, thereby holding down the connection modules B and the fiber optic cable C in between the top cover shell A1 and the bottom cover shell A2.

According to the aforesaid prior art fiber optic connector design, the mounting hooks A21 and the mounting grooves A22 of the bottom cover shell A2 are respectively forced into engagement with the mounting grooves A12 and the mounting hooks A11 of the top cover shell A1. When wishing to interchange the positions of the connection modules B and the fiber cores of the fiber optic cable C, a hand tool must be used to separate the respective mounting hooks A11 or A21 from the respective mounting grooves A22 or A12. However, the mounting hooks A11 or A21 may be broken accidentally when dismounting the top cover shell A1 and the bottom cover shell A2.

Therefore, it is desirable to provide a fiber optic connector that can easily be dismounted.

SUMMARY OF THE INVENTION

The present invention has been accomplished under the circumstances in view. It is one object of the present invention to provide a fiber optic connector, which is detachable, facilitating interchange of the positions of the connection modules and the fiber cores of the connected fiber optic.

To achieve this and other objects of the present invention, a fiber optic connector comprises a bottom cover shell having a rear extension, a rear cover covering the rear extension of the bottom cover shell to hold down a fiber optic in the rear extension of the bottom cover shell, and a top cover shell detachably covered on the bottom cover shell to hold down connection modules that are respectively connected to fiber cores of the fiber optic. By means of pressing a retaining block of the rear cover downwardly away from a rear end edge of the top cover shell, the top cover shell can be pushed backwards and then pulled upwards to move coupling flanges thereof along bottom grooves of the bottom cover shell and then out of side grooves of the bottom cover shell.

Further, the retaining block of the rear cover is located on a recessed thin wall portion of the top wall of the rear cover that enables the retaining block to be elastically moved up and down for releasably stopping against the rear end edge of the top cover shell to hold the top cover shell in position.

Further, the bottom grooves of the bottom cover shell slope downwardly forwards at an angle, for example, 30-degrees, and the coupling flanges of the top cover shell slope in the same direction and at the same angle for engaging into the bottom grooves of the bottom cover shell to secure the top cover shell to the bottom cover shell firmly against accidental stretching or twisting force from the fiber optic.

DETAILED DESCRIPTION OF THE PREFERRED EMBODIMENT

Figure 1:
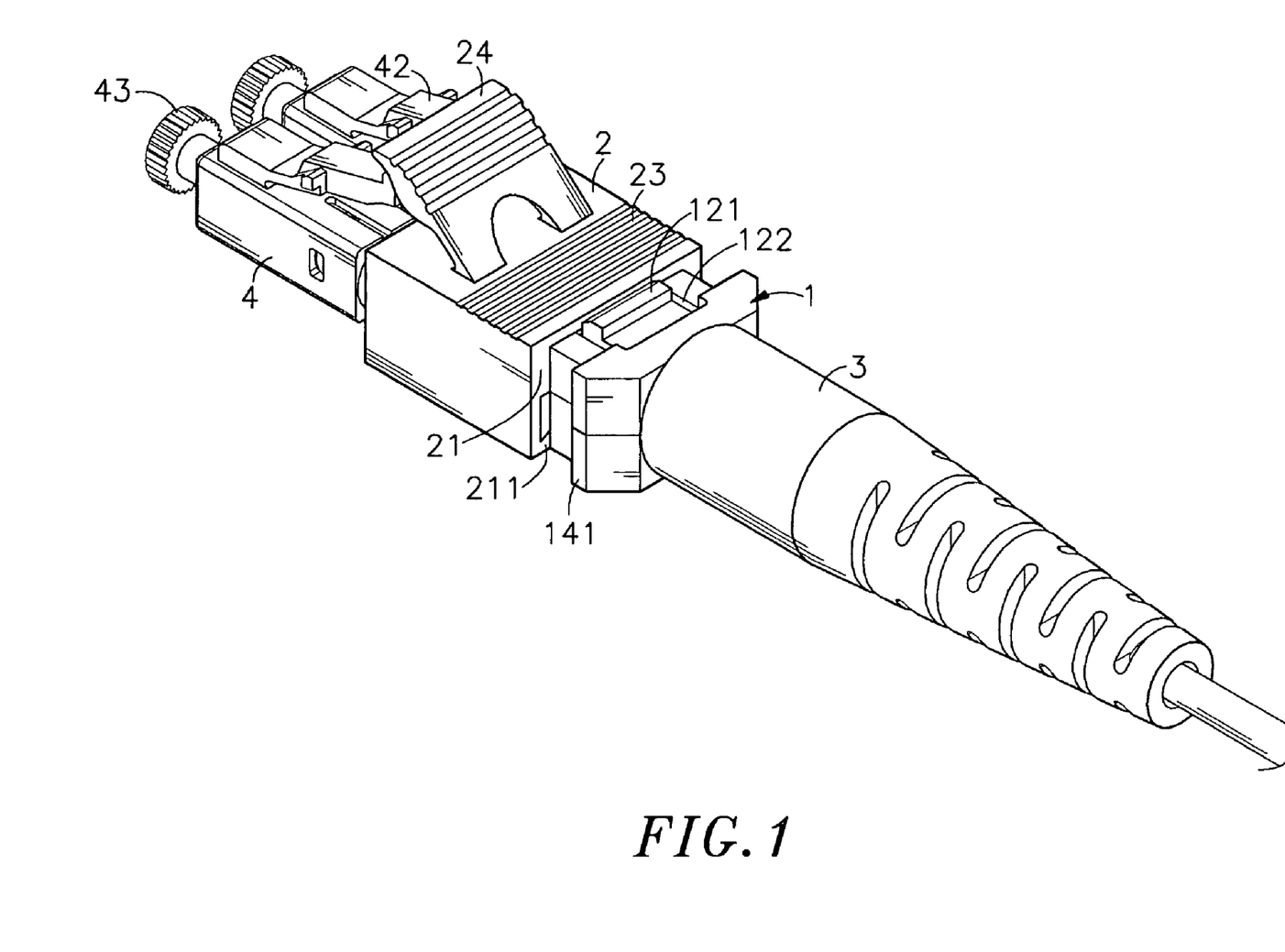
FIG. 1 is an isogonal view of the preferred embodiment of the present invention.
Figure 2:
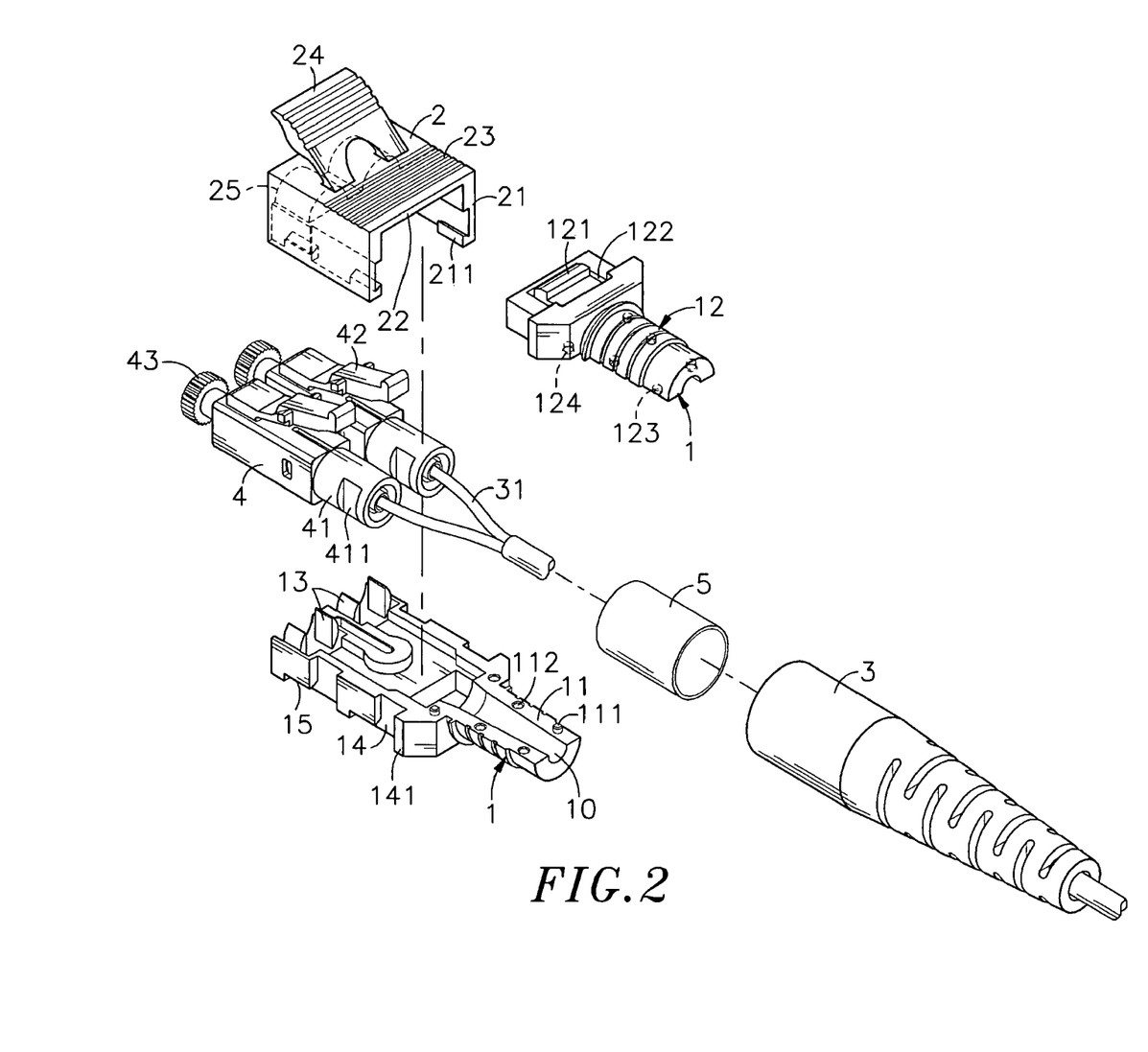
FIG. 2 is an exploded view of the preferred embodiment of the present invention.
Figure 3:
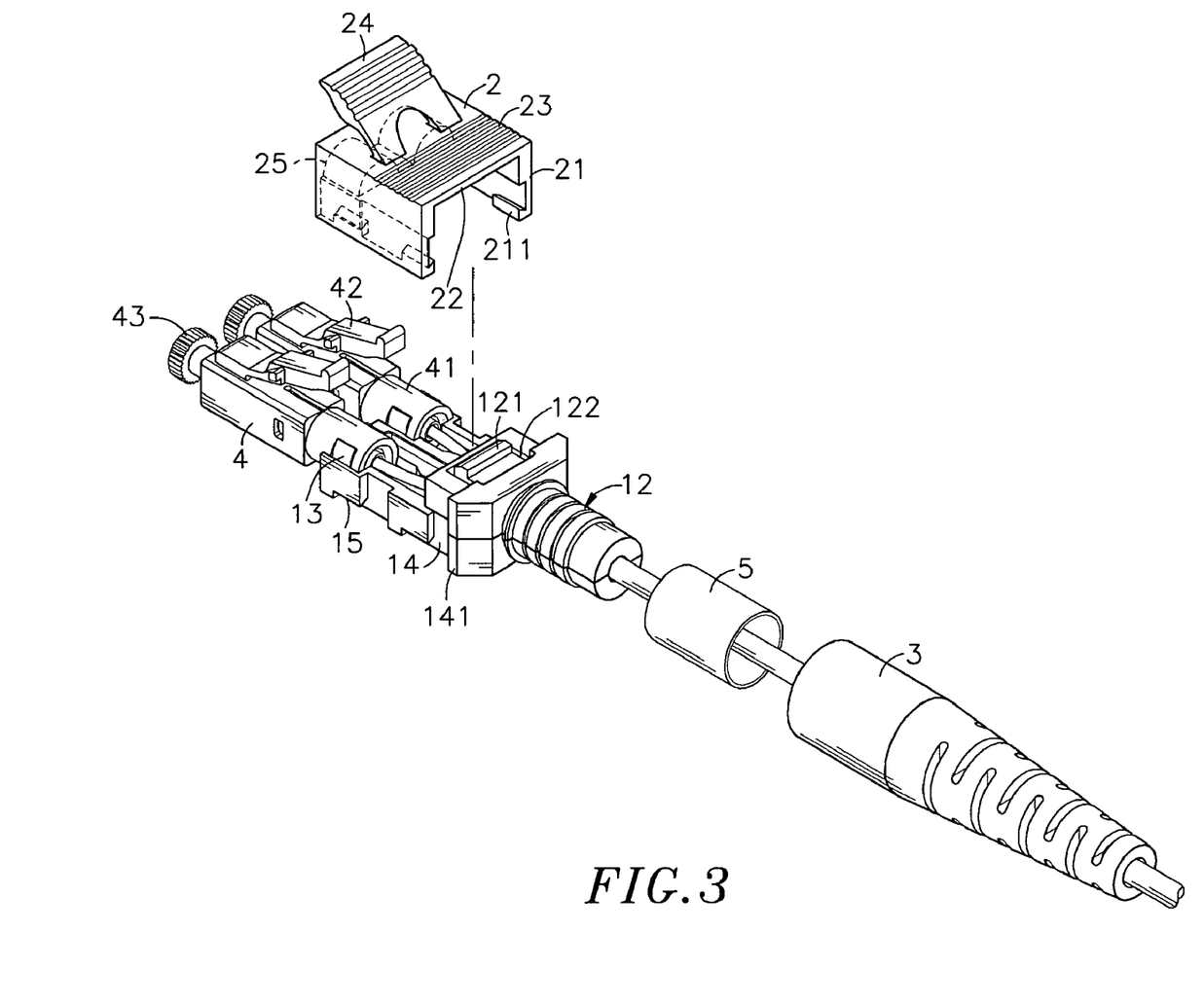
FIG. 3 is another exploded view of the preferred embodiment of the present invention.
Figure 4:
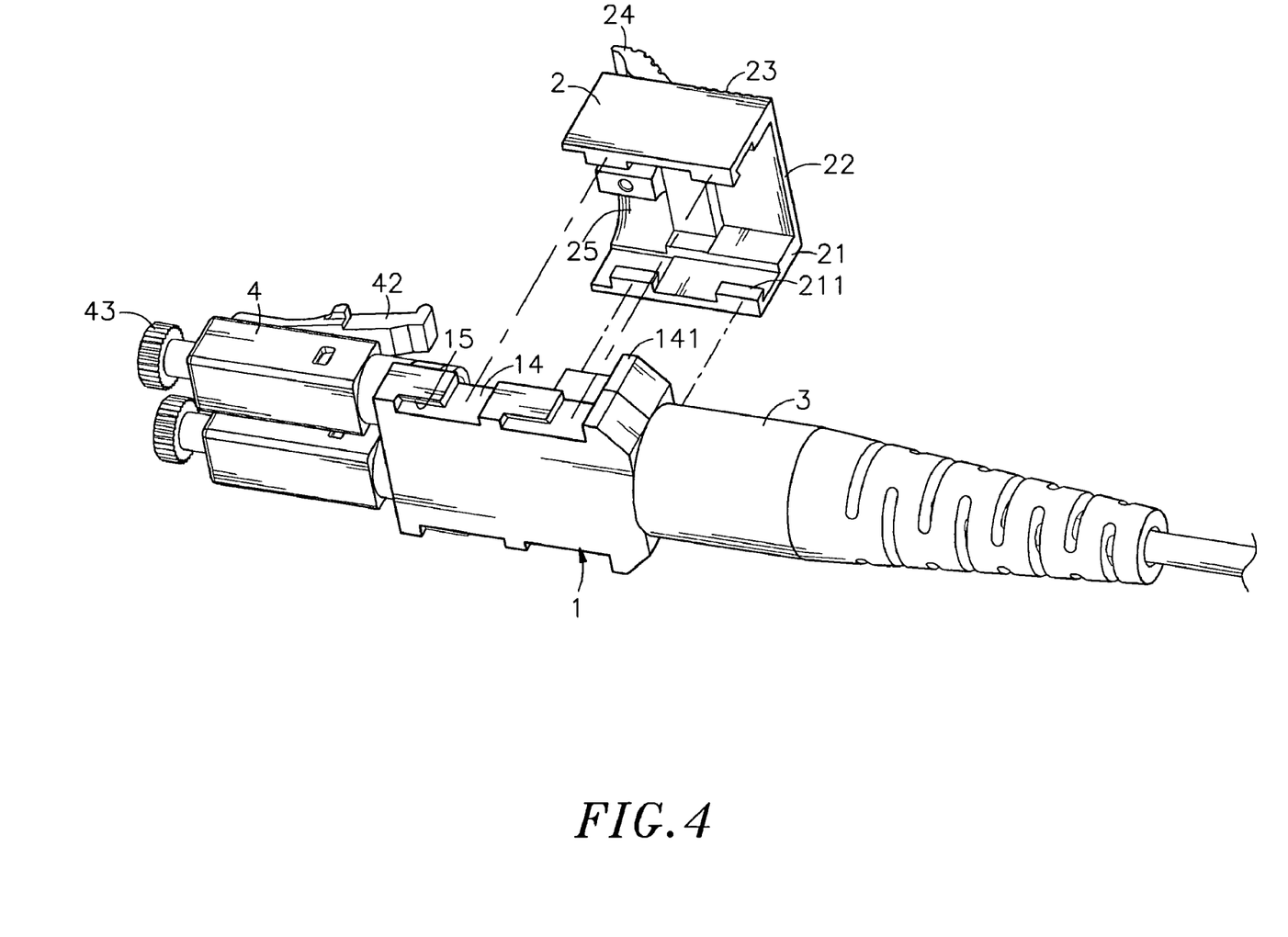
FIG. 4 is still another exploded view of the preferred embodiment of the present invention.
Figure 5:
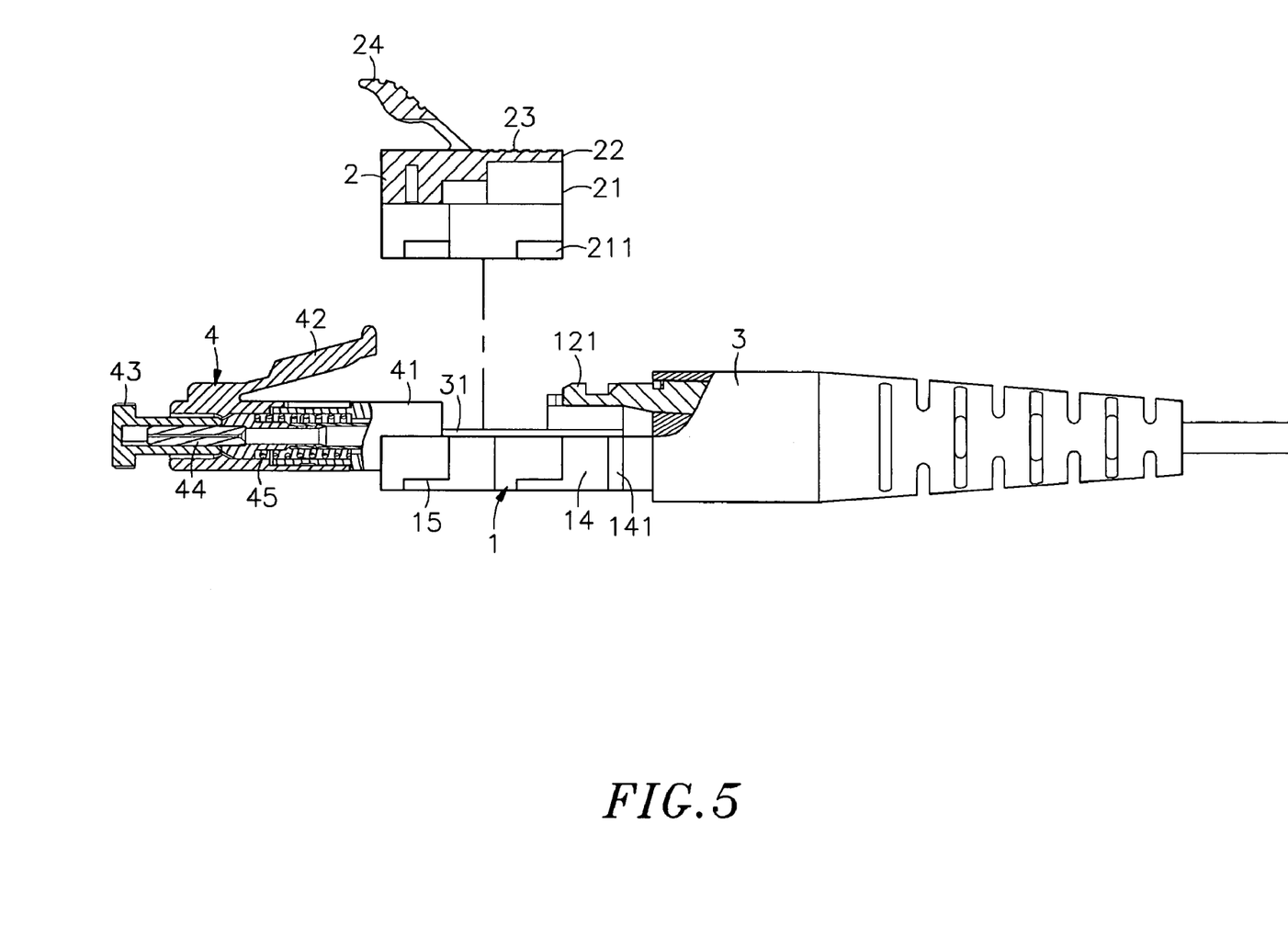
FIG. 5 is a sectional assembly view of the preferred embodiment of the present invention (I).
Figure 6:
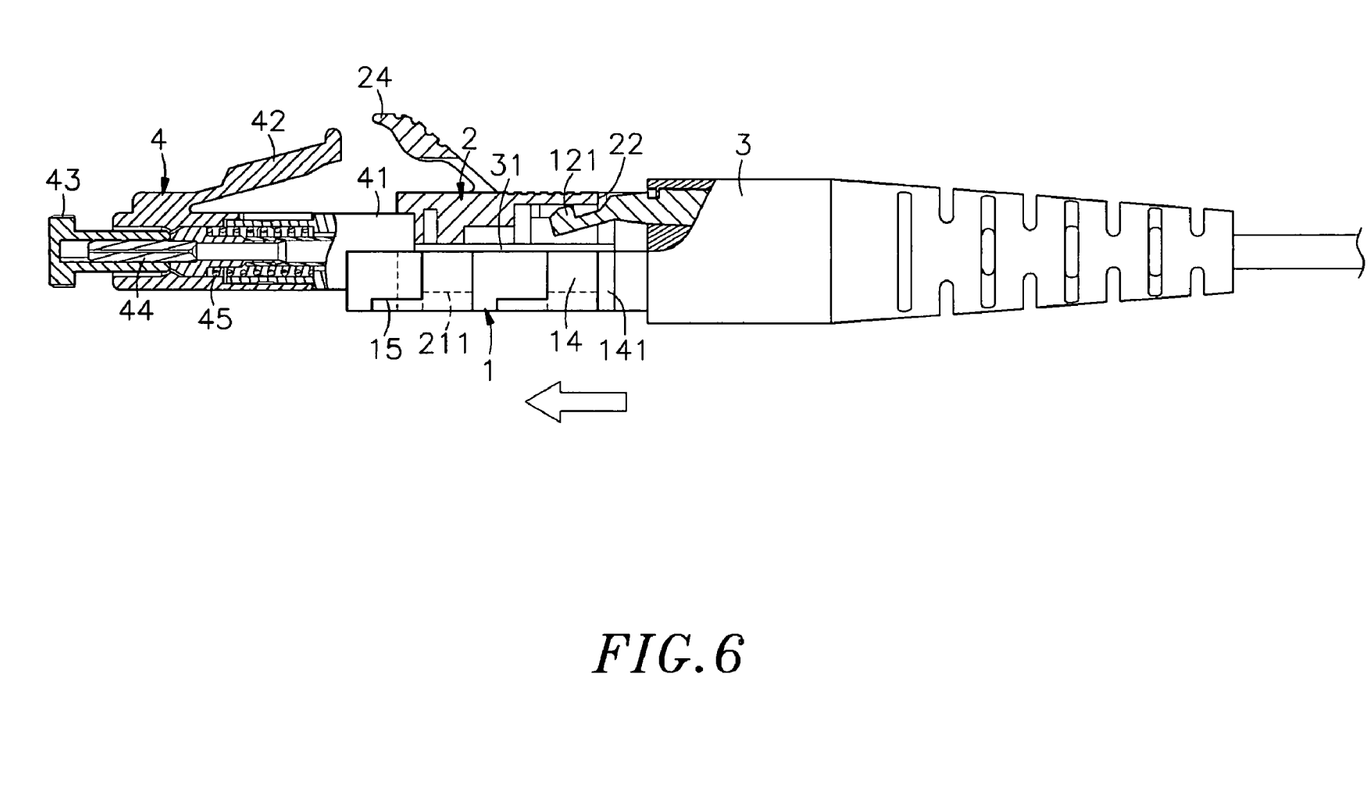
FIG. 6 is a sectional assembly view of the preferred embodiment of the present invention (II).

Referring to FIGS. 1 and 2, a fiber optic connector includes a bottom cover shell 1 and a top cover shell 2.

The bottom cover shell 1 comprises a rear extension 11, a rear cover 12 detachably covered on the top side of the rear extension 11 and defining with the rear extension 11 an insertion hole 10 for the insertion of fiber cores 31 of a fiber optic 3, two pairs of clamping portions 13 upwardly protruded from the top wall at the front side and arranged in a parallel manner for clamping two connection modules 4 that are respectively connected with the two fiber cores 31 of the fiber optic 3, a plurality of side grooves 14 symmetrically vertically formed in the two opposite lateral side walls thereof, and a plurality of bottom grooves 15 bilaterally formed in the bottom wall thereof and respectively disposed in communication with the side grooves 14. Further, the rear cover 12 comprises a retaining block 121 protruded from the top wall near the front side. The retaining block 121 is springy and vertically compressible.

The top cover shell 2 is covered on the top side of the bottom cover shell 1, comprising two opposite lateral sidewalls 21 respectively covered over the two opposite lateral sides of the bottom cover shell 1, a plurality of coupling flanges 211 respectively inwardly protruded from the bottom edges of the two opposite lateral sidewalls 21, which are respectively vertically inserted through the side grooves 14 of the bottom cover shell 1 and then moved forwards with the top cover shell 2 into engagement with the bottom grooves 15 of the bottom cover shell 1. After installation of the top cover shell 2 in the bottom cover shell 1, a rear end edge 22 of the top cover shell 2 is stopped against the front side of the retaining block 121 of the rear cover 12.

Referring to FIGS. 3~7, during installation of the fiber optic connector, insert the fiber cores 31 of the fiber optic 3 through the insertion hole 10, and then connect the connection modules 4 to the fiber cores 31 of the fiber optic 3, and then attach the connection modules 4 and the fiber cores 31 to the bottom cover shell 1 to force respective recessed positioning portions 411 of respective rear extensions 41 of the connection modules 4 into engagement with the clamping portions 13 of the bottom cover shell 1, and then attach the top cover shell 2 to the top side of the bottom cover shell 1 to force the coupling flanges 211 into the side grooves 14 of the bottom cover shell 1 respectively and to simultaneously compress the retaining block 121 downwards, and then press the thumb on transversely extending top linear ribs 23 of the top cover shell 2 to impart a forward pressure to the top cover shell 2 relative to the bottom cover shell 1 to further move the coupling flanges 211 into engagement with the bottom grooves 15 of the bottom cover shell 1. After the rear end edge 22 of the top cover shell 2 is stopped against the front side of the retaining block 121 of the rear cover 12, the front coupling flanges 211 of the top cover shell 2 are respectively stopped against the bottom grooves 15 of the bottom cover shell 1, and therefore the top cover shell 2 is prohibited from displacement relative to the bottom cover shell 1. The top cover shell 2 further comprises two locating grooves 25 that are kept attached to the periphery of the rear extensions 41 of the two connection modules 4 to hold down the two connection modules 4 in the bottom cover shell 1, and press bar 24 forwardly obliquely extended from a middle part of the top wall and stopped against retaining spring rods 42 of the connection modules 4. Further, a ferrule 5 is fastened to the rear extension 11 of the bottom cover shell 1 and the rear cover 12 to secure the rear extension 11 and the rear cover 12 firmly together.

Referring to FIGS. 2 and 7 again, during application of the present invention, remove front protective caps 43 of the connection modules 4 to have alignment rods 44 of the connection modules 4 that are respectively connected to the fiber cores 31 of the fiber optic 3 be exposed to the outside for insertion into insertion holes of an external connection socket (not shown) for transmission of optical signal.

Figure 7:
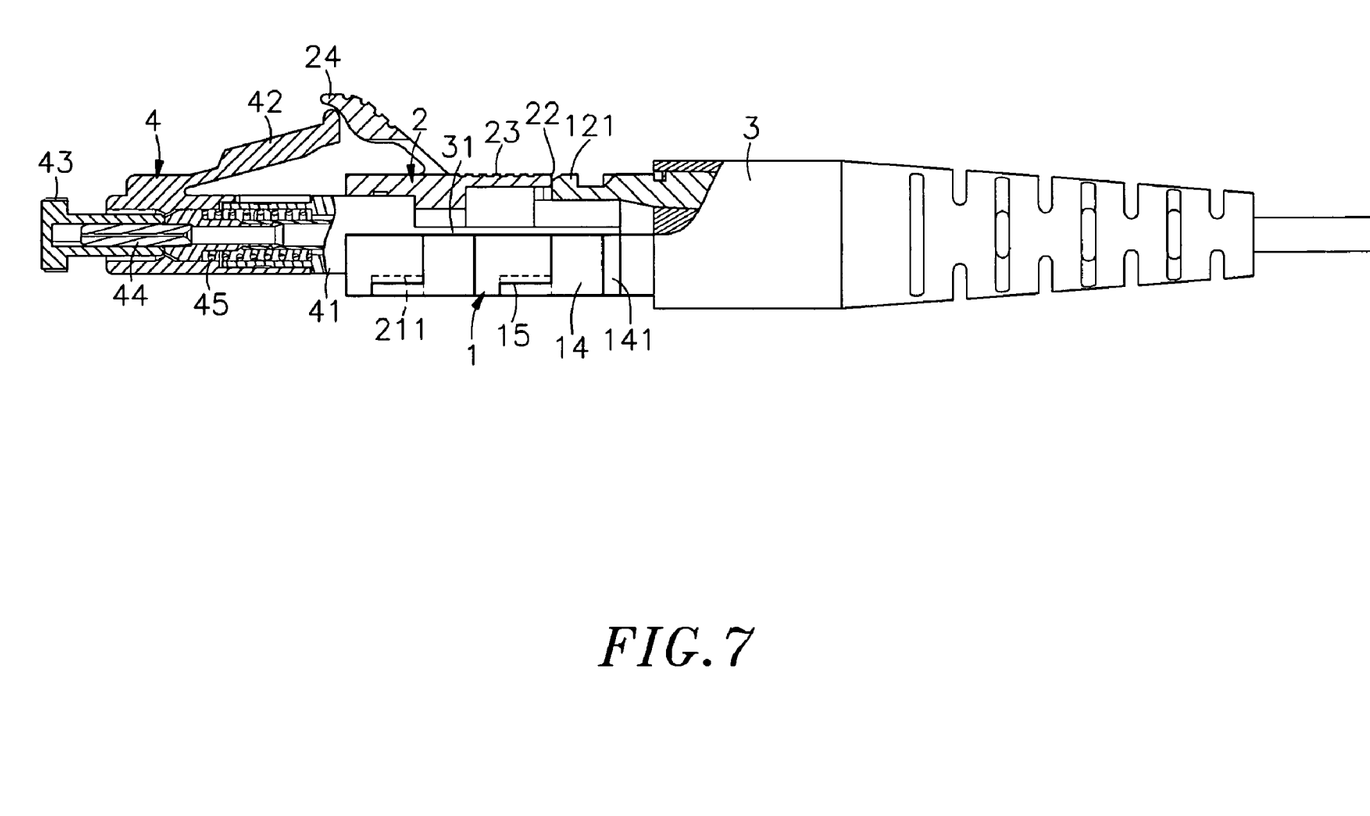
FIG. 7 is a sectional assembly view of the preferred embodiment of the present invention (III).

When the positions of the connection modules 4 are to be interchanged to fit a different application requirement, remove the top cover shell 2 from the bottom cover shell 1 for allowing change of the positions of the connection modules 4. When removing the top cover shell 2 from the bottom cover shell 1, press the retaining block 121 downwardly away from the rear end edge 22 of the top cover shell 2 with the thumb of one hand, and then grip the two opposite lateral sidewalls 21 of the top cover shell 2 with the thumb and forefinger of the other hand to push the top cover shell 2 backwards relative to the bottom cover shell 1 to the extent where the two rear-sided coupling flanges 211 of the top cover shell 2 are respectively stopped against a respective shoulder 141 adjacent to the rear extension 11 of the bottom cover shell 1, and then pull the top cover shell 2 upwards relative to the bottom cover shell 1 to move the coupling flanges 211 of the top cover shell 2 away from the bottom cover shell 1 along the side grooves 14. Thereafter, unpack the ferrule 5 and remove the rear cover 12 from the bottom cover shell 1 to have the connection modules 4 and the fiber cores 31 of the fiber optic 3 be exposed to the outside, and then interchange the positions of the connection modules 4 with the fiber cores 31 in the bottom cover shell 1. After the positions of the connection modules 4 with the fiber cores 31 in the bottom cover shell 1 have been interchanged, fasten the rear cover 12, the ferrule 5 and the top cover shell 2 to the bottom cover shell 1 again.

Further, the fiber optic connector can be a LC connector, and it is push and pull and widely used in single mode fiber network and in multimode network as well. The LC fiber optic connector in accordance with the present invention is detachable to facilitate re-installation of the round cable type fiber optic. Further, the number of the connection modules 4 matches the number of the fiber cores 31 of the optic fiber 3. Each connection module 4 further comprises a spring member 45 mounted in the rear extension 41 to facilitate connection of one fiber core 31 of the optic fiber 3 to the associating alignment rod 44.

Further, the bottom grooves 15 of the bottom cover shell 1 slope downwardly forwards at an angle, for example, 30-degrees. The coupling flanges 211 of the top cover shell 2 slope in the same direction and at the same angle relative to the bottom grooves 15 of the bottom cover shell 1. Further, the bottom grooves 15 can be dovetail grooves. In this case, the coupling flanges 211 of the top cover shell 2 are dovetail flanges fitting the dovetail groove type bottom grooves 15 to secure the two opposite sidewalls 21 of the top cover shell 2 firmly to the two opposite lateral sides of the bottom cover shell 1 against displacement.

Further, the rear extension 11 of the bottom cover shell 1 has a plurality of raised portions 111 and recessed portions 112 disposed at the top side; the rear cover 12 has a plurality of raised portions 123 and recessed portions 124 respectively forced into engagement with the recessed portions 112 and the raised portions 111 of the rear extension 11 of the bottom cover shell 1.

Further, the retaining block 21 of the rear cover 12 is located on a recessed thin wall portion 122 of the rear cover 12 that enables the retaining block 21 to be elastically moved up and down. Further, the rear cover 12 can be molded from an elastic plastic material that allows the retaining block 21 to be vertically compressed.

As stated above, the fiber optic connector of the present invention comprises a bottom cover shell 1 adapted to receive fiber cores 31 of a fiber optic 3 and connection modules 4 that are respectively connected to the fiber cores 31, a rear cover 12 detachably covered on a rear extension 11 of the bottom cover shell 1, and a top cover shell 2 detachably covered on the bottom cover shell 1 and stopped against a retaining block 121 of the rear cover 12 to hold down the connection modules 4 in the bottom cover shell 1. By means of pressing the retaining block 121 downwardly away from a rear end edge 22 of the top cover shell 2, the top cover shell 2 can be pushed backwards relative to the bottom cover shell 1 to move the coupling flanges 211 of the top cover shell 2 along bottom grooves 15 of the bottom cover shell 1, and then pulled vertically upwards and disconnected from the bottom cover shell 1. After disconnection of the top cover shell 2 from the bottom cover shell 1, the rear cover 12 is detached from the rear extension 11 of the bottom cover shell 1, and thus the fiber cores 31 and the connection modules 4 are exposed to the outside for allowing interchange of the positions of the fiber cores 31 and the connection modules 4 in the bottom cover shell 1. Therefore, interchange of the positions of the fiber cores 31 and the connection modules 4 in the bottom cover shell 1 is quite simple without any tools.

In conclusion, the detachable fiber optic connector has the following advantages and features:

1. By means of pressing the retaining block 121 of the rear cover 12 downwardly away from the rear end edge 22 of the top cover shell 2, the top cover shell 2 can be pushed backwards and then pulled upwards to move the coupling flanges 211 of the top cover shell 2 along the bottom grooves 15 of the bottom cover shell 1 and then out of the side grooves 14 of the bottom cover shell 1. Therefore, the fiber cores 31 and the connection modules 4 are exposed to the outside after removal of the rear cover 12 from the rear extension 11 of the bottom cover shell 1, allowing interchange of the positions of the fiber cores 31 and the connection modules 4 in the bottom cover shell 1.

2. The retaining block 21 of the rear cover 12 is located on a recessed thin wall portion 122 of the rear cover 12 that enables the retaining block 21 to be elastically moved up and down for releasably stopping against the rear end edge 22 of the top cover shell 2 to hold the top cover shell 2 in position.

3. The bottom grooves 15 of the bottom cover shell 1 slope downwardly forwards at an angle, for example, 30-degrees, and the coupling flanges 211 of the top cover shell 2 slope in the same direction and at the same angle for engaging into the bottom grooves 15 of the bottom cover shell 1 to secure the top cover shell 2 to the bottom cover shell 1 firmly against accidental stretching or twisting force from the fiber optic 3.

A prototype of fiber optic connector has been constructed with the features of FIGS. 1-7. The fiber optic connector functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A detachable fiber optic connector, comprising:
   a bottom cover shell holding a number of fiber cores of a fiber optic and a plurality of connection modules that are respectively connected to said fiber cores of said fiber optic, said bottom cover shell comprising a rear extending for supporting said fiber optic, a plurality of side grooves respectively symmetrically formed on two opposite sidewalls thereof and vertically extending to top and bottom sides of the two opposite sidewalls, and a plurality of bottom grooves bilaterally formed on a bottom wall thereof and respectively connected to said side grooves at right angles;
   a rear cover covering said rear extension of said bottom cover shell to hold down said fiber optic, said rear cover comprising a retaining block upwardly protruded from a top wall thereof and vertically downwardly compressible; and
   a top cover shell detachably covered on said bottom cover shell to hold down said connection modules, said top cover shell comprising a plurality of bottom coupling flanges respectively inwardly protruded from two opposite sidewalls thereof and vertically insertable through said side grooves of said bottom cover shell and forwardly engageable into said bottom grooves of said bottom cover shell, and a rear end edge for stopping against said retaining block of said rear cover after engagement of said coupling flanges into said bottom grooves.

2. The detachable fiber optic connector as claimed in claim 1, wherein said bottom grooves of said bottom cover shell slope downwardly forwards at an angle about 30-degrees; said coupling flanges of said top cover shell slope downwardly forwards at an angle about 30-degrees.

3. The detachable fiber optic connector as claimed in claim 1, wherein the top wall of said rear cover comprises a recessed thin wall portion, and said retaining block is located on said recessed thin wall portion.

4. The detachable fiber optic connector as claimed in claim 1, wherein said bottom cover shell comprises two shoulders respectively protruded from the two opposite sidewalls thereof along one said side groove at each sidewall of said bottom cover shell for stopping said coupling flanges of said top cover shell in said side grooves of said bottom cover shell.

5. The detachable fiber optic connector as claimed in claim 1, wherein said rear extension of said bottom cover shell comprises a plurality of raised portions and recessed portions disposed at a top side thereof; said rear cover comprises a plurality of recessed portions and raised portions disposed at a bottom side thereof and respectively forced into engagement with said raised portions and said recessed portions of said rear extension of said bottom cover shell.

6. The detachable fiber optic connector as claimed in claim 1, wherein said bottom cover shell comprises at least two pairs of clamping portions for clamping said connection modules.

7. The detachable fiber optic connector as claimed in claim 1, further comprising a ferrule fastened to said rear extension of said bottom cover shell and said rear cover.

8. The detachable fiber optic connector as claimed in claim 1, wherein said top cover shell comprises a plurality of transversely extending linear ribs formed on the top wall thereof.

9. The detachable fiber optic connector as claimed in claim 1, wherein said top cover shell comprises a plurality of locating grooves formed on a bottom surface of the top wall thereof and respectively attached to the periphery of said connection modules.

10. The detachable fiber optic connector as claimed in claim 1, wherein said top cover shell comprises a press bar forwardly obliquely extended from a middle part of the top wall thereof for stopping against retaining spring rods of said connection modules.

* * * * *